(12) United States Patent
Mohite et al.

(10) Patent No.: US 12,573,038 B2
(45) Date of Patent: Mar. 10, 2026

(54) METHODS AND SYSTEMS FOR PRECISE ESTIMATION OF CARBON EMISSION DUE TO TILLAGE OPERATIONS

(71) Applicant: Tata Consultancy Services Limited, Mumbai (IN)

(72) Inventors: Jayantrao Mohite, Thane (IN); Ankur Pandit, Indore (IN); Suryakant Ashok Sawant, Pune (IN); Rishabh Agrawal, Indore (IN); Srinivasu Pappula, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 328 days.

(21) Appl. No.: 18/397,475

(22) Filed: Dec. 27, 2023

(65) Prior Publication Data

US 2024/0331142 A1 Oct. 3, 2024

(30) Foreign Application Priority Data

Mar. 31, 2023 (IN) ............................. 202321024775

(51) Int. Cl.
*G06T 7/00* (2017.01)
*A01B 76/00* (2006.01)
(Continued)

(52) U.S. Cl.
CPC ............ *G06T 7/0012* (2013.01); *A01B 76/00* (2013.01); *G06T 2207/10032* (2013.01);
(Continued)

(58) Field of Classification Search
USPC ....................................................... 382/110
See application file for complete search history.

(56) References Cited

U.S. PATENT DOCUMENTS

| | | |
|---|---|---|
| 2012/0089304 A1 | 4/2012 | Hamilton et al. |
| 2021/0105931 A1 | 4/2021 | Anderson, Jr. et al. |
| 2022/0138767 A1 | 5/2022 | Ashtekar et al. |

OTHER PUBLICATIONS

Donato Cillis et al., "Modeling soil organic carbon and carbon dioxide emissions in different tillage systems supported by precision agriculture technologies under current climatic conditions," Soil and Tillage Research, Jun. 2018, Researchgate, https://www.researchgate.net/publication/325824405_Modeling_soil_organic_carbon_and_carbon_dioxide_emissions_in_different_tillage_systems_supported_by_precision_agriculture_technologies_under_current_climatic_conditions.

(Continued)

*Primary Examiner* — Jacky X Zheng
(74) *Attorney, Agent, or Firm* — Finnegan, Henderson, Farabow, Garrett & Dunner, LLP

(57) ABSTRACT

The disclosure relates generally to methods and systems for precise estimation of carbon emission due to tillage operations. Conventional techniques that estimate the carbon emission due to the tillage operation are not efficient and effective as only the tillage operation is considered. The present disclosure combines the type of implement used for tillage and the depth of tillage for precise estimation of carbon emission. In the present method, the geo-tagged fields where the tillage operation is performed are identified based on a satellite image data. Next, an implement type used for the tillage operation is detected. Further a spatial tillage depth having tillage depths are estimated. Lastly precise estimation of carbon released due to the tillage operation is calculated based on the soil organic carbon released due to tillage operation and the carbon emission due to fuel consumed by the type of implement used and the spatial tillage depth.

16 Claims, 8 Drawing Sheets

Field E

| | | | | | |
|---|---|---|---|---|---|
| 5 | 8 | 3 | 2 | 9 | 5 |
| 9 | 6 | 7 | 8 | 8 | 8 |
| 3 | 8 | 6 | 7 | 3 | 2 |
| 4 | 4 | 5 | 9 | 5 | 3 |
| 4 | 7 | 6 | 4 | 7 | 5 |

(51) Int. Cl.
    *G06V 20/10*       (2022.01)
    *G06V 20/13*       (2022.01)

(52) U.S. Cl.
    CPC ............... *G06T 2207/20081* (2013.01); *G06T 2207/30004* (2013.01); *G06T 2207/30188* (2013.01); *G06V 20/13* (2022.01); *G06V 20/188* (2022.01)

(56)           References Cited

OTHER PUBLICATIONS

İsmail Çelik, "Effects of Tillage Methods on Penetration Resistance, Bulk Density and Saturated Hydraulic Conductivity in a Clayey Soil Conditions," Journal of Agricultural Sciences, 2011, https://dergipark.org.tr/en/download/article-file/21051.

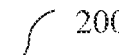

200

Receive a pre-defined geographical area in which a tillage operation is performed, wherein the pre-defined geographical area comprises a plurality of geo-tagged fields 202

Receive a first image of the pre-defined geographical area and one or more second images of the pre-defined geographical area, using a satellite image data, wherein the first image is before the tillage operation is performed and the one or more second images are after the tillage operation is performed 204

Determine a field-level vertical-vertical (VV) backscatter difference, a field-level vertical-horizontal (VH) backscatter difference, a field-level VV coherence, a field-level VH coherence, from the first image and the one or more second images, using an image analysis technique 206

Identify one or more geo-tagged fields having the tillage operation detected, among the plurality of geo-tagged fields, using a trained tillage operation classification model, based the field-level VV backscatter difference, the field-level VH backscatter difference, the field-level VV coherence, and the field-level VH coherence 208

Determine for each geo-tagged field of the one or more geo-tagged fields having the tillage operation detected, one or more normalized difference vegetation indices (NDVIs), one or more normalized difference tillage indices (NDTIs), one or more coherence indices, one or more entropy bands, and one or more soil texture bands, from the one or more second images, using the image analysis technique 210

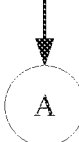

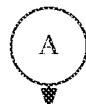
A

Detect an implement type among a plurality of implement types, used for the tillage operation in each geo-tagged field of the one or more geo-tagged fields having the tillage operation detected, using a trained implement type classification model, based on the one or more NDVIs, the one or more NDTIs, the one or more coherence indices, the one or more entropy bands, and the one or more soil texture bands, pertaining to each geo-tagged field 212

Determine for each geo-tagged field of the one or more geo-tagged fields having the tillage operation detected, one or more tillage depth indices and a soil texture, from the one or more second images, using the image analysis technique 214

Estimate a spatial tillage depth map, of each geo-tagged field of the one or more geo-tagged fields having the tillage operation detected, using a trained tillage depth estimation model, based on the one or more tillage depth indices and the soil texture, pertaining to each geo-tagged field 216

Estimate a fuel quantity required for each geo-tagged field of the one or more geo-tagged fields having the tillage operation detected, based on the implement type used and the spatial tillage depth map pertaining to each pre-geo-tagged field, using a fuel quantity look-up table 218

Calculate a carbon emission due to fuel, for each geo-tagged field of the one or more geo-tagged fields having the tillage operation detected, based on the fuel quantity required pertaining to each geo-tagged field, using an emission factor look-up table 220

Estimate a soil organic carbon released due to the tillage operation, for each geo-tagged field of the one or more geo-tagged fields having the tillage operation detected, based on the spatial tillage depth map and the soil texture pertaining to each geo-tagged field 222

B

FIG. 2B

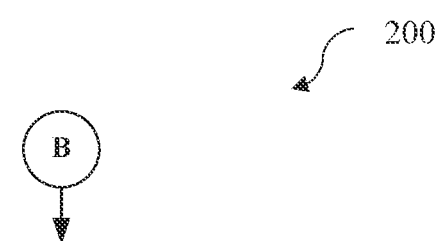

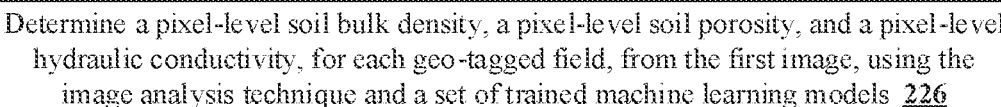

Calculate a precise estimation of carbon released due to the tillage operation, for each geo-tagged field of the one or more geo-tagged fields having the tillage operation detected, based on the soil organic carbon released due to the tillage operation and the carbon emission due to fuel, corresponding to each geo-tagged field 224

Determine a pixel-level soil bulk density, a pixel-level soil porosity, and a pixel-level hydraulic conductivity, for each geo-tagged field, from the first image, using the image analysis technique and a set of trained machine learning models 226

Determine a pixel-level tillage depth prescription map, for each geo-tagged field, based on the pixel-level soil bulk density, the pixel-level soil porosity, and the pixel-level hydraulic conductivity, of the pertaining geo-tagged field 228

Calculate the carbon emission due to fuel and a needed tillage depth, for each geo-tagged field, based on the fuel quantity required and the pixel-level tillage depth prescription map pertaining to each geo-tagged field, using the emission factor look-up table 230

Estimate the soil organic carbon released due to the needed tillage depth, for each geo-tagged field, based on the soil texture and the pixel-level tillage depth prescription map pertaining to each geo-tagged field 232

Calculate the precise emission of carbon released due to the needed tillage depth, for each geo-tagged field, based on the soil organic carbon released due to the needed tillage depth and the soil organic carbon released due to the needed tillage depth pertaining to each geo-tagged field 234

Estimate an excessive carbon emission, for each geo-tagged field, based on the precise emission of carbon released due to the tillage operation and the precise emission of carbon released due to the needed tillage depth, pertaining to each geo-tagged field 236

FIG. 2C

Field E

| 5 | 8 | 3 | 2 | 9 | 5 |
|---|---|---|---|---|---|
| 9 | 6 | 7 | 8 | 8 | 8 |
| 3 | 8 | 6 | 7 | 3 | 2 |
| 4 | 4 | 5 | 9 | 5 | 3 |
| 4 | 7 | 6 | 4 | 7 | 5 |

Bulk Density

| 1.32 | 1.1 | 1.43 | 1.15 | 1.27 | 1.43 |
| 1.43 | 1.27 | 1.43 | 0.99 | 1.38 | 1.32 |
| 1.27 | 0.99 | 1.32 | 1.38 | 1.27 | 1.38 |
| 1.38 | 1.15 | 1.15 | 1.32 | 1.43 | 1.15 |
| 1.59 | 0.99 | 1.15 | 1.59 | 1.59 | 1.59 |

Porosity

| 0.29 | 0.38 | 0.33 | 0.33 | 0.33 | 0.29 |
| 0.41 | 0.32 | 0.29 | 0.38 | 0.38 | 0.41 |
| 0.41 | 0.33 | 0.29 | 0.33 | 1.27 | 0.41 |
| 0.32 | 0.29 | 0.32 | 0.38 | 0.29 | 0.41 |
| 0.32 | 0.33 | 0.33 | 0.32 | 0.32 | 0.38 |

Hydraulic Conductivity

| 0.54 | 0.77 | 0.54 | 0.77 | 1.12 | 1.12 |
| 1.12 | 0.54 | 1.12 | 1.12 | 0.67 | 0.77 |
| 0.67 | 1.06 | 1.06 | 0.67 | 0.67 | 0.81 |
| 0.81 | 0.77 | 0.54 | 0.70 | 1.06 | 0.81 |
| 0.81 | 0.81 | 0.81 | 0.77 | 1.06 | 0.38 |

FIG. 7

Tillage Depth Needed

| 2 | 3 | 0 | 2 | 5 | 1 |
| 4 | 2 | 2 | 4 | 2 | 3 |
| 0 | 5 | 4 | 1 | 3 | 0 |
| 0 | 1 | 3 | 2 | 0 | 1 |
| 1 | 5 | 0 | 2 | 3 | 2 |

FIG. 8

METHODS AND SYSTEMS FOR PRECISE ESTIMATION OF CARBON EMISSION DUE TO TILLAGE OPERATIONS

PRIORITY CLAIM

This U.S. patent application claims priority under 35 U.S.C. § 119 to: Indian patent application Ser. No. 202321024775, filed on Mar. 31, 2023. The entire contents of the aforementioned application are incorporated herein by reference.

TECHNICAL FIELD

The disclosure herein generally relates to the field of carbon emission estimation, and more specifically to methods and systems for precise estimation of carbon emission due to tillage operations.

BACKGROUND

Climate change is one of the major concerns in the world, which is causing a tremendous shift in implications of an environment such as an unseasonal rainfall, an extreme temperature, an unpredictable flood, droughts, etc. Various measures are being undertaken to minimize the impact of climate change. One of the commonly focused areas is reducing a carbon footprint. Land use and land cover change and agricultural practices contribute about 20% of the global annual emission of carbon dioxide ($CO_2$). Agriculture is one of the major contributors to total greenhouse gas (GHG) emissions. The processes related to agricultural practices from an industry to a farm to a house, emit GHGs at every step that significantly contributes to the global warming. Tillage is one of the widely followed agricultural practices before sowing of a crop which significantly contributes to the carbon emissions.

A tillage operation is defined as a mechanical manipulation of the soil, using an implement. There are many types of implements available in the market that are used to perform tillage operations at various depths in the soil. Carbon emission due to the tillage operations is mainly by two ways. One way is a direct emission due to an amount of fuel consumed by the implement to perform the tillage operation. The amount of fuel consumed by the implement to perform the tillage operation, depends on various factors including soil properties, implement size, a type of the implement used, and a depth of tillage. The second way is that the tillage operation causes disturbances in the soil thus carbon stabilization in the soil gets disturbed, organic matters are unveiled for oxidation and thus loss of soil organic carbon (SOC) occurs, which further results in the carbon emission due to the tillage operation.

Various techniques are available in the art for estimation of the carbon emission due to the tillage operation, so that a preventive mechanism to reduce the carbon footprint can be established. Most of the conventional approaches that estimates the carbon emission due to the tillage operation, mainly focuses on whether the tillage has been performed or not and the carbon emissions are estimated based on a binary decision multiplied by relevant emissions factor. However, the literature suggests that the type of implement used for the tillage operation, has a significant impact on the level of carbon emission hence only detecting the tillage will help in crude estimates and not the precise/actual estimates. Further, the depth of tillage is also crucial as the SOC in the topsoil is removed based on the depth of tillage. Hence the conventional techniques that estimates the carbon emission due to the tillage operation are not efficient and effective as only the tillage operation is considered for the estimation.

SUMMARY

Embodiments of the present disclosure present technological improvements as solutions to one or more of the above-mentioned technical problems recognized by the inventors in conventional systems.

In an aspect, a processor-implemented method for precise estimation of carbon emission due to tillage operations is provided. The method including the steps of: receiving a pre-defined geographical area in which a tillage operation is performed, wherein the pre-defined geographical area comprises a plurality of geo-tagged fields; receiving a first image of the pre-defined geographical area and one or more second images of the pre-defined geographical area, using a satellite image data, wherein the first image is before the tillage operation is performed and the one or more second images are after the tillage operation is performed; determining a field-level vertical-vertical (VV) backscatter difference, a field-level vertical-horizontal (VH) backscatter difference, a field-level VV coherence, a field-level VH coherence, from the first image and the one or more second images, using an image analysis technique; identifying one or more geo-tagged fields having the tillage operation detected, among the plurality of geo-tagged fields, using a trained tillage operation classification model, based the field-level VV backscatter difference, the field-level VH backscatter difference, the field-level VV coherence, and the field-level VH coherence; determining for each geo-tagged field of the one or more geo-tagged fields having the tillage operation detected, one or more normalized difference vegetation indices (NDVIs), one or more normalized difference tillage indices (NDTIs), one or more coherence indices, one or more entropy bands, and one or more soil texture bands, from the one or more second images, using the image analysis technique; detecting an implement type among a plurality of implement types, used for the tillage operation in each geo-tagged field of the one or more geo-tagged fields having the tillage operation detected, using a trained implement type classification model, based on the one or more NDVIs, the one or more NDTIs, the one or more coherence indices, the one or more entropy bands, and the one or more soil texture bands, pertaining to each geo-tagged field; determining for each geo-tagged field of the one or more geo-tagged fields having the tillage operation detected, one or more tillage depth indices and a soil texture, from the one or more second images, using the image analysis technique; estimating a spatial tillage depth map, of each geo-tagged field of the one or more geo-tagged fields having the tillage operation detected, using a trained tillage depth estimation model, based on the one or more tillage depth indices and the soil texture, pertaining to each geo-tagged field; estimating a fuel quantity required for each geo-tagged field of the one or more geo-tagged fields having the tillage operation detected, based on the implement type used and the spatial tillage depth map pertaining to each pre-geo-tagged field, using a fuel quantity look-up table; calculating a carbon emission due to fuel, for each geo-tagged field of the one or more geo-tagged fields having the tillage operation detected, based on the fuel quantity required pertaining to each geo-tagged field, using an emission factor look-up table, estimating a soil organic carbon released due to the tillage operation, for each geo-tagged field of the one or more geo-tagged fields having the tillage operation detected, based on the spatial tillage depth map and the soil texture pertaining to each geo-tagged field; calculating a precise estimation of carbon released due to the tillage operation, for each geo-tagged field of the one or more geo-tagged fields having the tillage operation detected, based on the soil organic carbon released due to the tillage operation and the carbon emission due to fuel, pertaining to each geo-tagged field; determining a pixel-level soil bulk density, a pixel-level soil porosity, and a pixel-level hydraulic conductivity, for each geo-tagged field, from the first image, using the image analysis technique and a set of trained machine learning models; determining a pixel-level tillage depth prescription map, for each geo-tagged field, based on the pixel-level soil bulk density, the pixel-level soil porosity, and the pixel-level hydraulic conductivity, of the pertaining geo-tagged field; calculating the carbon emission due to fuel and a needed tillage depth, for each geo-tagged field, based on the fuel quantity required and the pixel-level tillage depth prescription map pertaining to each geo-tagged field, using the emission factor look-up table; estimating the soil organic carbon released due to the needed tillage depth, for each geo-tagged field, based on the soil texture and the pixel-level tillage depth prescription map pertaining to each geo-tagged field; calculating precise emission of carbon released due to the needed tillage depth, for each geo-tagged field, based on the soil organic carbon released due to the needed tillage depth and the soil organic carbon released due to the needed tillage depth pertaining to each geo-tagged field; and estimating an excessive carbon emission, for each geo-tagged field, based on the precise emission of carbon released due to the tillage operation and the precise emission of carbon released due to the needed tillage depth, pertaining to each geo-tagged field.

In another aspect, a system for precise estimation of carbon emission due to tillage operations is provided. The system includes: a memory storing instructions; one or more Input/Output (I/O) interfaces; and one or more hardware processors coupled to the memory via the one or more I/O interfaces, wherein the one or more hardware processors are configured by the instructions to: receive a pre-defined geographical area in which a tillage operation is performed, wherein the pre-defined geographical area comprises a plurality of geo-tagged fields; receive a first image of the pre-defined geographical area and one or more second images of the pre-defined geographical area, using a satellite image data, wherein the first image is before the tillage operation is performed and the one or more second images are after the tillage operation is performed; determine a field-level vertical-vertical (VV) backscatter difference, a field-level vertical-horizontal (VH) backscatter difference, a field-level VV coherence, a field-level VH coherence, from the first image and the one or more second images, using an image analysis technique; identify one or more geo-tagged fields having the tillage operation detected, among the plurality of geo-tagged fields, using a trained tillage operation classification model, based the field-level VV backscatter difference, the field-level VH backscatter difference, the field-level VV coherence, and the field-level VH coherence; determine for each geo-tagged field of the one or more geo-tagged fields having the tillage operation detected, one or more normalized difference vegetation indices (NDVIs), one or more normalized difference tillage indices (NDTIs), one or more coherence indices, one or more entropy bands, and one or more soil texture bands, from the one or more second images, using the image analysis technique; detect an implement type among a plurality of implement types, used for the tillage operation in each geo-tagged field of the one or more geo-tagged fields having the tillage operation detected, using a trained implement type classification model, based on the one or more NDVIs, the one or more NDTIs, the one or more coherence indices, the one or more entropy bands, and the one or more soil texture bands, pertaining to each geo-tagged field; determine for each geo-tagged field of the one or more geo-tagged fields having the tillage operation detected, one or more tillage depth indices and a soil texture, from the one or more second images, using the image analysis technique; estimate a spatial tillage depth map, of each geo-tagged field of the one or more geo-tagged fields having the tillage operation detected, using a trained tillage depth estimation model, based on the one or more tillage depth indices and the soil texture, pertaining to each geo-tagged field; estimate a fuel quantity required for each geo-tagged field of the one or more geo-tagged fields having the tillage operation detected, based on the implement type used and the spatial tillage depth map pertaining to each pre-geo-tagged field, using a fuel quantity look-up table; calculate a carbon emission due to fuel, for each geo-tagged field of the one or more geo-tagged fields having the tillage operation detected, based on the fuel quantity required pertaining to each geo-tagged field, using an emission factor look-up table; estimate a soil organic carbon released due to the tillage operation, for each geo-tagged field of the one or more geo-tagged fields having the tillage operation detected, based on the spatial tillage depth map and the soil texture pertaining to each geo-tagged field; calculate a precise estimation of carbon released due to the tillage operation, for each geo-tagged field of the one or more geo-tagged fields having the tillage operation detected, based on the soil organic carbon released due to the tillage operation and the carbon emission due to fuel, pertaining to each geo-tagged field; determine a pixel-level soil bulk density, a pixel-level soil porosity, and a pixel-level hydraulic conductivity, for each geo-tagged field, from the first image, using the image analysis technique and a set of trained machine learning models; determine a pixel-level tillage depth prescription map, for each geo-tagged field, based on the pixel-level soil bulk density, the pixel-level soil porosity, and the pixel-level hydraulic conductivity, of the pertaining geo-tagged field; calculate the carbon emission due to fuel and a needed tillage depth, for each geo-tagged field, based on the fuel quantity required and the pixel-level tillage depth prescription map pertaining to each geo-tagged field, using the emission factor look-up table; estimate the soil organic carbon released due to the needed tillage depth, for each geo-tagged field, based on the soil texture and the pixel-level tillage depth prescription map pertaining to each geo-tagged field; calculate the precise emission of carbon released due to the needed tillage depth, for each geo-tagged field, based on the soil organic carbon released due to the needed tillage depth and the soil organic carbon released due to the needed tillage depth pertaining to each geo-tagged field; and estimate an excessive carbon emission, for each geo-tagged field, based on the precise emission of carbon released due to the tillage operation and the precise emission of carbon released due to the needed tillage depth, pertaining to each geo-tagged field.

In yet another aspect, there are provided one or more non-transitory machine-readable information storage mediums comprising one or more instructions which when executed by one or more hardware processors cause: receiving a pre-defined geographical area in which a tillage operation is performed, wherein the pre-defined geographical area comprises a plurality of geo-tagged fields; receiving a first image of the pre-defined geographical area and one or more second images of the pre-defined geographical area, using a satellite image data, wherein the first image is before the tillage operation is performed and the one or more second images are after the tillage operation is performed; determining a field-level vertical-vertical (VV) backscatter difference, a field-level vertical-horizontal (VH) backscatter difference, a field-level VV coherence, a field-level VH coherence, from the first image and the one or more second images, using an image analysis technique; identifying one or more geo-tagged fields having the tillage operation detected, among the plurality of geo-tagged fields, using a trained tillage operation classification model, based the field-level VV backscatter difference, the field-level VH backscatter difference, the field-level VV coherence, and the field-level VH coherence; determining for each geo-tagged field of the one or more geo-tagged fields having the tillage operation detected, one or more normalized difference vegetation indices (NDVIs), one or more normalized difference tillage indices (NDTIs), one or more coherence indices, one or more entropy bands, and one or more soil texture bands, from the one or more second images, using the image analysis technique; detecting an implement type among a plurality of implement types, used for the tillage operation in each geo-tagged field of the one or more geo-tagged fields having the tillage operation detected, using a trained implement type classification model, based on the one or more NDVIs, the one or more NDTIs, the one or more coherence indices, the one or more entropy bands, and the one or more soil texture bands, pertaining to each geo-tagged field; determining for each geo-tagged field of the one or more geo-tagged fields having the tillage operation detected, one or more tillage depth indices and a soil texture, from the one or more second images, using the image analysis technique; estimating a spatial tillage depth map, of each geo-tagged field of the one or more geo-tagged fields having the tillage operation detected, using a trained tillage depth estimation model, based on the one or more tillage depth indices and the soil texture, pertaining to each geo-tagged field; estimating a fuel quantity required for each geo-tagged field of the one or more geo-tagged fields having the tillage operation detected, based on the implement type used and the spatial tillage depth map pertaining to each pre-geo-tagged field, using a fuel quantity look-up table; calculating a carbon emission due to fuel, for each geo-tagged field of the one or more geo-tagged fields having the tillage operation detected, based on the fuel quantity required pertaining to each geo-tagged field, using an emission factor look-up table; estimating a soil organic carbon released due to the tillage operation, for each geo-tagged field of the one or more geo-tagged fields having the tillage operation detected, based on the spatial tillage depth map and the soil texture pertaining to each geo-tagged field; calculating a precise estimation of carbon released due to the tillage operation, for each geo-tagged field of the one or more geo-tagged fields having the tillage operation detected, based on the soil organic carbon released due to the tillage operation and the carbon emission due to fuel, pertaining to each geo-tagged field; determining a pixel-level soil bulk density, a pixel-level soil porosity, and a pixel-level hydraulic conductivity, for each geo-tagged field, from the first image, using the image analysis technique and a set of trained machine learning models; determining a pixel-level tillage depth prescription map, for each geo-tagged field, based on the pixel-level soil bulk density, the pixel-level soil porosity, and the pixel-level hydraulic conductivity, of the pertaining geo-tagged field; calculating the carbon emission due to fuel and a needed tillage depth, for each geo-tagged field, based on the fuel quantity required and the pixel-level tillage depth prescription map pertaining to each geo-tagged field, using the emission factor look-up table; estimating the soil organic carbon released due to the needed tillage depth, for each geo-tagged field, based on the soil texture and the pixel-level tillage depth prescription map pertaining to each geo-tagged field; calculate the precise emission of carbon released due to the needed tillage depth, for each geo-tagged field, based on the soil organic carbon released due to the needed tillage depth and the soil organic carbon released due to the needed tillage depth pertaining to each geo-tagged field; and estimating an excessive carbon emission, for each geo-tagged field, based on the precise emission of carbon released due to the tillage operation and the precise emission of carbon released due to the needed tillage depth, pertaining to each geo-tagged field.

In an embodiment, the spatial tillage depth map of each geo-tagged field comprises one or more tillage depths determined in the corresponding geo-tagged field and one or more location coordinates associated with each of the one or more tillage depths.

In an embodiment, the trained tillage operation classification model is obtained by: receiving a plurality of training tillage operation samples associated with a plurality of training geo-tagged fields and a training tillage class label associated with each training tillage operation sample of the plurality of training tillage operation samples, wherein each training tillage operation sample comprises a training field-level VV backscatter difference, a training field-level VH backscatter difference, a training field-level VV coherence, and a training field-level VH coherence; and training a random forest classification model, with the plurality of training tillage operation samples and the training tillage class label associated with each training tillage operation sample, to obtain the trained tillage operation classification model.

In an embodiment, the trained implement type classification model is obtained by: receiving a plurality of training tillage implement samples associated with a plurality of training geo-tagged fields and a training tillage implement type class label associated with each training tillage implement sample of the plurality of training tillage implement samples, wherein each training tillage implement sample comprises one or more training NDVIs, one or more training NDTIs, one or more training coherence indices, one or more training entropy bands, and one or more training soil texture bands; and training a random forest classification model, with the plurality of training tillage implement samples and the training tillage implement type class label associated with each training tillage implement sample, to obtain the trained implement type classification model.

In an embodiment, the trained tillage depth estimation model is obtained by: receiving a plurality of training tillage depth samples associated with a plurality of training geo-tagged fields, wherein each training tillage depth sample comprises one or more training tillage depth indices, a training soil texture, one or more training tillage depths measured in the corresponding geo-tagged field, and one or more training location coordinates associated with each of the one or more training tillage depths; and training a random forest regression model, with the plurality of training tillage depth samples, to obtain the trained tillage depth estimation model.

In an embodiment, determining the field-level VV backscatter difference, and the field-level VH backscatter difference, from the first image and the one or more second images, using the image analysis technique, comprises: calculating a field-level VV backscatter value and a field-level VH backscatter value, from each of the first image and the one or more second images; determining the field-level VV backscatter difference based on the field-level VV backscatter value calculated from each of the first image and the one or more second images; and determining the VH backscatter difference based on the field-level VH backscatter value calculated from each of the first image and the one or more second images.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A, 2B and 2C illustrate exemplary flow diagrams of a processor-implemented method for precise estimation of carbon emission due to tillage operations, in accordance with some embodiments of the present disclosure.

FIG. 7 illustrates an exemplary pixel-level soil bulk density, an exemplary pixel-level soil porosity, and an exemplary pixel-level hydraulic conductivity, for the exemplary geo-tagged field E, according to some embodiments of the present disclosure.

FIG. 8 illustrates an exemplary pixel-level tillage depth prescription map with needed tillage depths, for the exemplary geo-tagged field E, according to some embodiments of the present disclosure.

DETAILED DESCRIPTION

Figure 1:
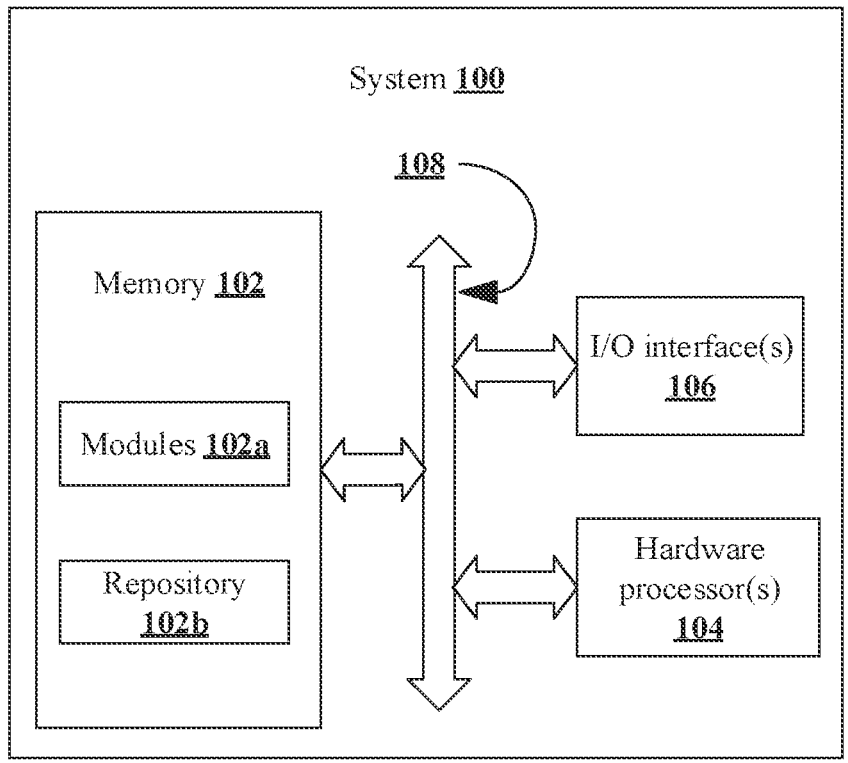
FIG. 1 is an exemplary block diagram of a system for precise estimation of carbon emission due to tillage operations, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure solves the technical problems in the art for precise estimation of carbon emission due to tillage operations by accounting not only based on the tillage operation detection, but also the type of implement used for tillage and depth of tillage. Further, the present disclosure makes use of satellite image data, which effectively helps in precise estimation of carbon emission due to tillage operations.

Referring now to the drawings, and more particularly to FIG. 1 through FIG. 8, where similar reference characters denote corresponding features consistently throughout the figures, there are shown preferred embodiments and these embodiments are described in the context of the following exemplary systems and/or methods.

FIG. 1 is an exemplary block diagram of a system 100 for precise estimation of carbon emission due to tillage operations, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102b is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Referring to FIGS. 2A, 2B and 2C, components and functionalities of the system 100 are described in accordance with an example embodiment of the present disclosure. For example, FIGS. 2A, 2B and 2C illustrate exemplary flow diagrams of a processor-implemented method 200 for precise estimation of carbon emission due to tillage operations, in accordance with some embodiments of the present disclosure. Although steps of the method 200 including process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 202 of the method 200, the one or more hardware processors 104 of the system 100 are configured to receive a pre-defined geographical area in which the tillage operation is performed. The pre-defined geographical area includes a plurality of geo-tagged fields. The pre-defined geographical area is defined by a set of boundaries or coordinates, such as latitudes and longitudes. Each geo-tagged field of the plurality of geo-tagged fields is identified by a unique identifier (ID) such as field ID and comprise a geo-tagged boundaries or coordinates, such as the latitudes and the longitudes. In an embodiment, the pre-defined geographical area is an agricultural area or any other field where the tillage operation is performed in at least one geo-tagged field of the plurality of geo-tagged fields such as farm areas.

At step 204 of the method 200, the one or more hardware processors 104 of the system 100 are configured to receive a first image of the pre-defined geographical area and one or more second images of the pre-defined geographical area. The first image is taken before the tillage operation is performed and the one or more second images are taken after the tillage operation is performed in at least one geo-tagged field of the plurality of geo-tagged fields. The one or more second images are taken at certain phase/time interval and each second image of the one or more second images indicate some tillage operation is performed in at least one geo-tagged field.

The first image and the one or more second images of the pre-defined geographical area are taken from the satellite image data. In an embodiment, the satellite image data is a synthetic aperture radar (SAR) based satellite data collected from Sentinel-1 and an optical satellite data collected from Sentinel-2.

At step 206 of the method 200, the one or more hardware processors 104 of the system 100 are configured to determine a field-level vertical-vertical (VV) backscatter difference, a field-level vertical-horizontal (VH) backscatter difference, a field-level VV coherence, a field-level VH coherence, from each of the first image and of the one or more second images. An image analysis technique is employed on each of the first image and of the one or more second images, to determine the field-level vertical-vertical (VV) backscatter difference, the field-level vertical-horizontal (VH) backscatter difference, the field-level VV coherence, and the field-level VH coherence. The parameters of the field-level vertical-vertical (VV) backscatter difference, the field-level vertical-horizontal (VH) backscatter difference, the field-level VV coherence, and the field-level VH coherence, denotes a change in the pre-defined geographical area especially in each of the plurality of geo-tagged fields, before and after the tillage operation is performed.

In an embodiment, the first image and the one or more second images received from the SAR based satellite data collected from Sentinel-1, are pre-processed, and analyzed. The preprocessing involves application of an orbit file, a ground range detected (GRD) border noise and thermal noise removal, a radiometric calibration, and a terrain correction. After getting the backscatter images, further preprocessing involves, extracting the information for the image sample geotagged fields by compositing and clipping operations.

As the SAR based satellite data is available before and after the tillage operation, after pre-processing of the images, firstly, a field-level VV (in dB), a field-level VH backscatter (in dB), and an incidence angle (in degree) are calculated from each of the first image (before the tillage operation), relevant second image (after the tillage operation). Further, a field-level VV coherence and a field-level VH coherence between the first image (before the tillage operation) and the relevant second image (after the tillage operation) is calculated. Then, the field-level VV backscatter difference is calculated by subtracting the field-level VV of the first image (before the tillage operation) from the field-level VV of the corresponding second image (after the tillage operation). Similarly, the field-level VH backscatter difference is calculated by subtracting the field-level VH of the first image (before the tillage operation) from the field-level VH of the corresponding second image (after the tillage operation). Further, similarly, the field-level W coherence and the field-level VH coherence are calculated from the field-level VV coherence and the field-level VH coherence between the first image (before the tillage operation) and the relevant second image (after the tillage operation).

Figure 3:
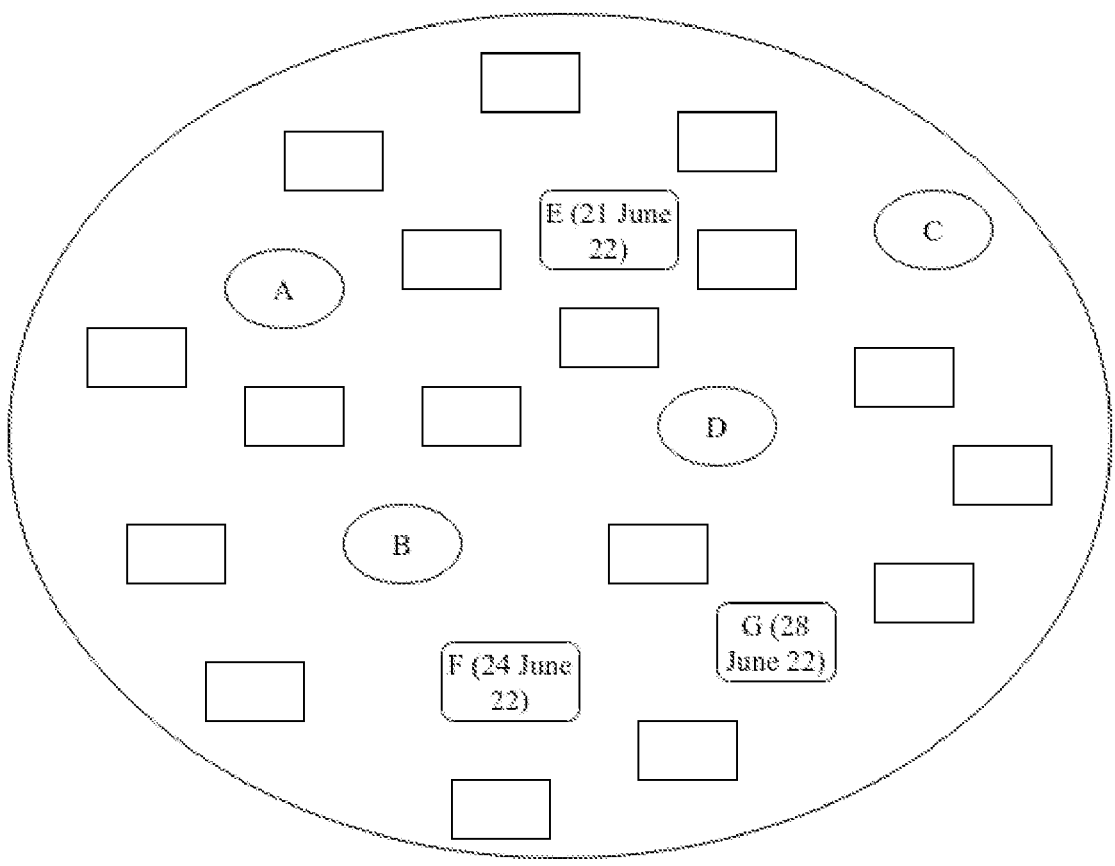
FIG. 3 illustrates an exemplary pre-defined geographical area having a plurality of exemplary geo-tagged fields, according to some embodiments of the present disclosure.

FIG. 3 illustrates an exemplary pre-defined geographical area having a plurality of exemplary geo-tagged fields, according to some embodiments of the present disclosure. As shown in FIG. 3, the exemplary pre-defined geographical area comprises the plurality of exemplary geo-tagged fields where the tillage operation is already performed on some of the exemplary geo-tagged fields, the tillage operation to be performed on some of the exemplary geo-tagged fields, and the remaining exemplary geo-tagged fields are untouched at this point of time. Assume that the exemplary pre-defined geo-tagged fields A, B, C, D are with no tillage and tillage was done on the exemplary pre-defined geo-tagged fields E, F, G on 21 June, 24 June, and 28 Jun. 2022 respectively. The remaining exemplary pre-defined geo-tagged fields are the fields in the region of interest, where the tillage is performed or not to be detected.

Also assume that, for the region of interest, the Sentinel-1 image was available on 18 Jun. 2022 (before the tillage) and 30 Jun. 2022 (after the tillage) respectively. Then for both of those images, VV difference, VH difference and angle are determined and the coherence between the two images is calculated. The same example is further carried in some of the subsequent steps to describe the method 200.

At step 208 of the method 200, the one or more hardware processors 104 of the system 100 are configured to identify one or more geo-tagged fields having the tillage operation detected, among the plurality of geo-tagged fields, based the field-level VV backscatter difference, the field-level VH backscatter difference, the field-level VV coherence, and the field-level VH coherence determined at step 206 of the method 200. A trained tillage operation classification model is employed to identify the one or more geo-tagged fields having the tillage operation detected, among the plurality of geo-tagged fields. Identifying the presence (detection) of the tillage operation is mathematically expressed as in equation 1:

$$\text{Presence of Tillage} = \tag{1}$$
$$f(VV \text{ difference}, VH \text{ difference}, VV \text{ coherence}, VH \text{ coherence})$$

In an embodiment, the trained tillage operation classification model is obtained with the following step. At first step, a plurality of training tillage operation samples associated with a plurality of training geo-tagged fields are received along with a training tillage class label associated with each training tillage operation sample of the plurality of training tillage operation samples. Each training tillage operation sample comprises a training field-level VV backscatter difference, a training field-level VH backscatter difference, a training field-level VV coherence, and a training field-level VH coherence.

In an embodiment, the training field-level VV backscatter difference, the training field-level VH backscatter difference, the training field-level VV coherence, and the training field-level VH coherence present in each training tillage operation sample are obtained in the same way as described at step 206 of the method 200 using a plurality of training tillage operation images. The training tillage class label indicates the presence or absence of the tillage operation detected associated with each training tillage operation sample. In an embodiment, each training tillage operation sample is annotated with the corresponding training tillage class label which is one of (i) the tillage operation detected and (ii) the tillage operation not detected.

At the second step, a machine learning model such as a random forest classification model is trained with the plurality of training tillage operation samples and the training tillage class label associated with each training tillage operation sample, to obtain the trained tillage operation classification model. During the training, the training field-level VV backscatter difference, the training field-level VH backscatter difference, the training field-level VV coherence, and the training field-level VH coherence present in each training tillage operation sample are passed as input variables and the corresponding training tillage class label is passed as an output variable. The trained tillage operation classification model is able to classify each geo-tagged field with one of (i) the tillage operation detected and (ii) the tillage operation not detected, based on the corresponding field-level VV backscatter difference, the corresponding field-level VH backscatter difference, the corresponding field-level VV coherence, and the corresponding field-level VH coherence.

Figure 4:
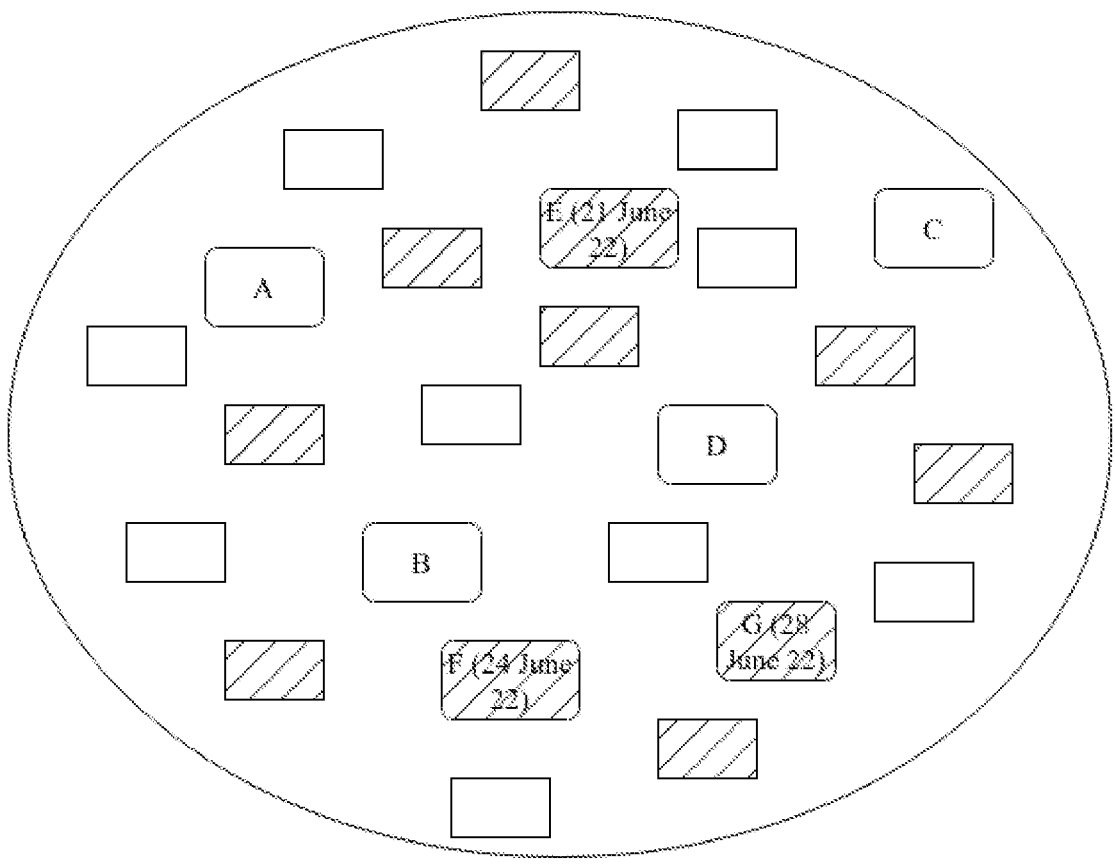
FIG. 4 illustrates the exemplary pre-defined geographical area having the plurality of exemplary geo-tagged fields where the tillage operation is performed, according to some embodiments of the present disclosure.

FIG. 4 illustrates the exemplary pre-defined geographical area having the plurality of exemplary geo-tagged fields where the tillage operation is performed, according to some embodiments of the present disclosure. The trained tillage operation classification model is employed on the plurality of exemplary geo-tagged fields of FIG. 3, to detect where the tillage operation is performed. As shown in FIG. 4, the exemplary geo-tagged fields with hatched fill are the fields detected with the tillage operation (activity) during 18-30 Jun. 2022.

The scope of the present disclosure also includes calculating a field-level Horizontal-Horizontal (HH) backscatter difference and a field-level Vertical-Vertical (HH) backscatter difference along with the field-level VV backscatter difference and field-level VH backscatter difference, for certain type of applications where the precise emission estimation is required.

At step 210 of the method 200, the one or more hardware processors 104 of the system 100 are configured to determine one or more normalized difference vegetation indices (NDVIs), one or more normalized difference tillage indices (NDTIs), one or more coherence indices, one or more entropy bands, and one or more soil texture bands, for each geo-tagged field where the tillage operation is detected at step 208 of the method 200. The one or more normalized difference vegetation indices (NDVIs), the one or more normalized difference tillage indices (NDTIs), the one or more coherence indices, the one or more entropy bands, and the one or more soil texture bands, are determined from the one or more second images, using the image analysis technique.

Each of the one or more normalized difference vegetation indices, indicates the difference of the normalized vegetation indices between two subsequent image samples (the one or more second images) where the tillage operation is already performed. So, the number of the one or more normalized difference vegetation indices, depends on the number of the one or more second images. If there is only one second image, then the corresponding normalized vegetation index is considered as the normalized difference vegetation index. The same process is applicable to the one or more normalized difference tillage indices (NDTIs), the one or more coherence indices, the one or more entropy bands, and the one or more soil texture bands.

More specifically, surface reflectance data from various spectral bands of Sentinel-2 (one or more second images) is processed to get indices such as the one or more normalized difference vegetation indices (NDVIs) and the one or more normalized difference tillage indices (NDTIs). These indices are calculated for each image available after the tillage activity for the time-period when soil is clearly visible (i.e., during within season fallow period). Consider having 5 satellite images are available after the tillage activity. Four NDVI difference and NDTI difference images will be obtained and used as features (parameters in the analysis).

$NDVI_{t1}$=NDVI of time T0 before tillage—NDVI of time T1 after tillage Similar calculations for all four instances of NDVI and NDTI are performed. The features are noted as $NDVI_{t1}$, $NDTI_{t1}$, . . . $NDVI_{t4}$, $NDTI_{t4}$.

Also, after pre-processing of Sentinel-1 SAR satellite data (one or more second images), coherence between two consecutive images is determined. Consider 4 Sentinel-1 satellite images being available after the tillage activity, 3 coherence images will be generated and used as features (parameters). These are coherence indices denoted as Coherence t1, Coherence t2, and Coherence t3.

In addition to this texture information in terms of entropy (there are many textural parameters such as mean, variance, homogeneity, contrast, dissimilarity, entropy, second moment, and correlation) will be generated using each of the VV and VH bands. Hence 4 VV entropy bands and 4 VH entropy bands are considered. These are called textural indices denoted as VH entropy$_{t1}$, . . . VH entropy$_{t4}$ for VH and VV entropy$_{t1}$, . . . . VV entropy$_{t4}$ for VV. Further, soil texture information is also considered as one of the features to determine the one or more soil texture bands.

At step 212 of the method 200, the one or more hardware processors 104 of the system 100 are configured to detect an implement type used for the tillage operation in each geo-tagged field of the one or more geo-tagged fields having the tillage operation detected at step 208 of the method 200. The implement type is one among a plurality of implement types from a list including but are not limited to a harrow, a disk plow, a mold board plow, a rotavator, and a sub-soiler.

A trained implement type classification model is employed to detect the implement type used for the tillage operation in each geo-tagged field, based on the one or more NDVIs, the one or more NDTIs, the one or more coherence indices, the one or more entropy bands, and the one or more soil texture bands, pertaining to each geo-tagged field, obtained at step 210 of the method 200. Detecting the type of implement used for the tillage operation for each geo-tagged field is mathematically expressed as in equation 2:

$$\text{Implement used} = f(NDVI, NDTI, \text{Coherence, Entropy, Soil Texture}) \quad (2)$$

In an embodiment, the trained implement type classification model is obtained with the following step. At first step, a plurality of training tillage implement samples associated with the plurality of training geo-tagged fields are received along with a training tillage implement type class label associated with each training tillage implement sample of the plurality of training tillage implement samples. Each training tillage implement sample includes one or more training NDVIs, one or more training NDTIs, one or more training coherence indices, one or more training entropy bands, and one or more training soil texture bands.

In an embodiment, the one or more training NDVIs, the one or more training NDTIs, the one or more training coherence indices, the one or more training entropy bands, and one or more training soil texture bands present in training tillage implement sample are determined in the same way as described at step 210 of the method 200 using a plurality of training tillage operation images. The training tillage implement type class label indicates the type of the implement type used for the tillage operation detected, among the plurality of implement types from a list including but are not limited to the harrow, the disk plow, the mold board plow, the rotavator, and the sub-soiler. In an embodiment, each training tillage implement sample is annotated with the corresponding training tillage implement type class label which is one among the plurality of implement types.

At the second step, the machine learning model such as the random forest classification model is trained with the plurality of training tillage implement samples and the training tillage implement type class label associated with each training tillage implement sample, to obtain the trained implement type classification model. During the training, the one or more training NDVIs, the one or more training NDTIs, the one or more training coherence indices, the one or more training entropy bands, and the one or more training soil texture bands present in each training tillage implement sample are passed as input variables and the corresponding training tillage implement type class label is passed as an output variable.

The trained implement type classification model classifies each geo-tagged field with the tillage operation detected at step 208 of the method 200, with the implement type used for the tillage operation, based on the one or more NDVIs, the one or more NDTIs, the one or more coherence indices, the one or more entropy bands, and the one or more soil texture bands, pertaining to each geo-tagged field.

Figures 5, 6:
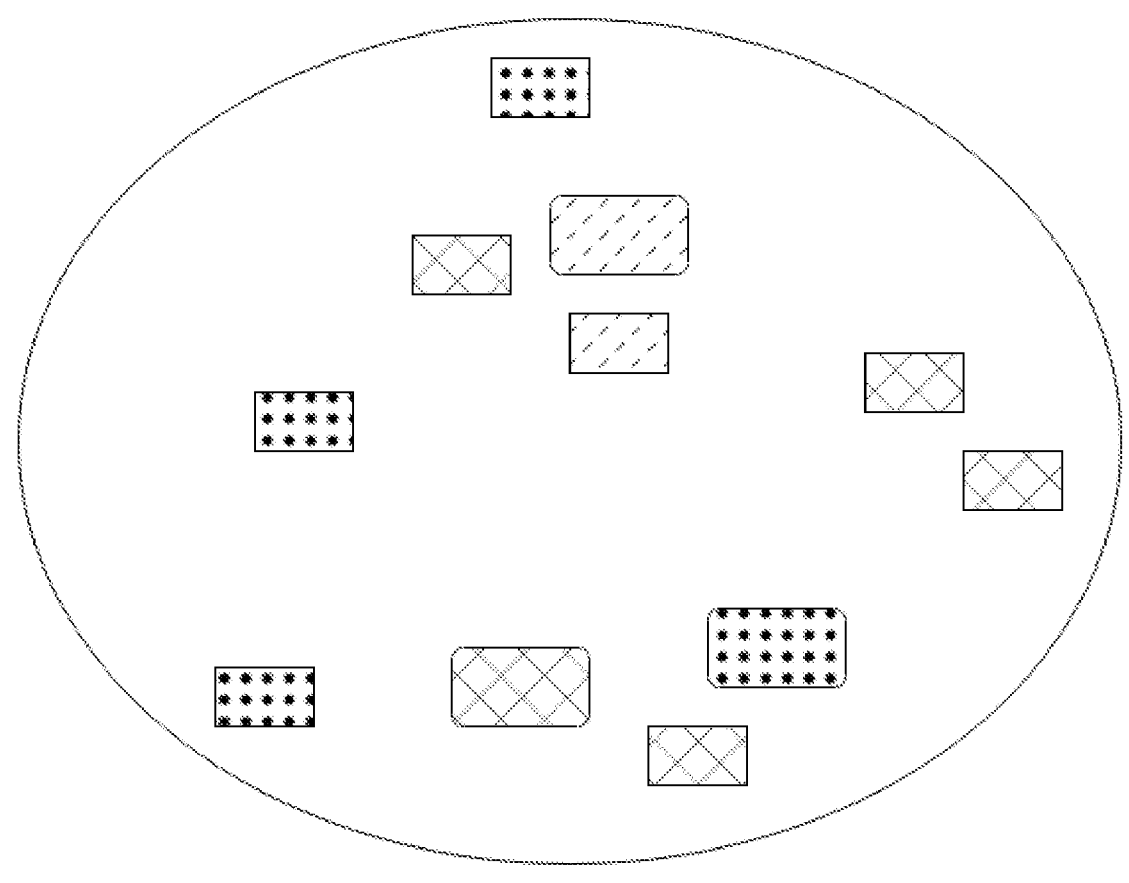
FIG. 5 illustrates the exemplary pre-defined geographical area having the plurality of exemplary geo-tagged fields with the type of implement used for each exemplary geo-tagged field, according to some embodiments of the present disclosure.
FIG. 6 illustrates an exemplary spatial tillage depth map for the exemplary geo-tagged field E, according to some embodiments of the present disclosure.

Consider that the trained implement type classification model is employed on the plurality of exemplary geo-tagged fields where the tillage operation is performed of FIG. 4, and the trained implement type classification model classify the type of implement used for the tillage operation. FIG. 5 illustrates the exemplary pre-defined geographical area having the plurality of exemplary geo-tagged fields with the type of implement used for each exemplary geo-tagged field, according to some embodiments of the present disclosure. As shown in FIG. 5, the exemplary geo-tagged fields with dotted fill are tilled with the type of implement sub-soiler (SS), the exemplary geo-tagged fields with dashed fill are tilled with disc plough (DP) and the exemplary geo-tagged fields with cross-hatch fill are tilled with rotavator (RV).

At step 214 of the method 200, the one or more hardware processors 104 of the system 100 are configured to determine one or more tillage depth indices and a soil texture, for each geo-tagged field of the one or more geo-tagged fields where the tillage operation is detected at step 208 of the method 200. The one or more tillage depth indices and the soil texture are determined from the one or more second images (after the tillage operation), using the image analysis technique.

The one or more tillage depth indices indicates the one or more tillage depths performed across the geo-tagged field during the tillage operation. In an embodiment, each geo-tagged field includes a field id, one or more locations (in latitudes and longitudes) of the tillage operation within the field id, and the tillage depth (or a depth of the tillage) (in centimeter (cm) or millimeter (mm)) at each location (in latitudes and longitudes) of the tillage operation within the field id. The one or more tillage depths are referred as the one or more tillage depths for the particular geo-tagged field.

In an embodiment, the tillage depth at each location is determined as a tillage depth index (TDI) from the one or more second images using the corresponding field-level VV backscatter difference, the field-level VH backscatter difference, the field-level VV coherence, and the field-level VH coherence that are determined at step 206 of the method 200. The soil texture refers to the texture of the soil in the pertaining geo-tagged field. Determining the tillage depth index (TDI) and corresponding tillage depth at each pixel for each geo-tagged field are mathematically expressed as in equation 3 and 4 respectively:

$$TDI = f(VV \text{ difference}, VH \text{ difference}, \text{Coherence}) \quad (3)$$

$$\text{Tillage Depth} = f(TDI_{t_1}, TDI_{t_2}, \dots, TDI_{t_n}, \text{Soil Texture}) \quad (4)$$

At step 216 of the method 200, the one or more hardware processors 104 of the system 100 are configured to estimate a spatial tillage depth map, of each geo-tagged field of the one or more geo-tagged fields where the tillage operation is detected at step 208 of the method 200. The spatial tillage depth map of each geo-tagged field comprises the one or more tillage depths (in cm or mm) determined in the pertaining geo-tagged field and one or more location coordinates (in latitudes and longitudes) associated with each of the one or more tillage depths.

A trained tillage depth estimation model is employed to estimate the spatial tillage depth map of each geo-tagged field, based on the one or more tillage depth indices and the soil texture pertaining to each geo-tagged field determined at step 214 of the method 200.

In an embodiment, the trained tillage depth estimation model is obtained with the following step. At first step, a plurality of training tillage depth samples associated with the plurality of training geo-tagged fields are received. Each training tillage depth sample comprises one or more training tillage depth indices, a training soil texture, one or more training tillage depths (in cm or mm) measured in the pertaining geo-tagged field, and one or more training location coordinates (in latitudes and longitudes) associated with each of the one or more training tillage depths.

In an embodiment, the one or more training tillage depth indices, the training soil texture, the one or more training tillage depths measured in the pertaining geo-tagged field, and the one or more training location coordinates associated with each of the one or more training tillage depths are determined in the same way as described at step 214 of the method 200 using a plurality of training tillage operation images.

At the second step, the machine learning model such a random forest regression model is trained with the plurality of training tillage depth samples, to obtain the trained tillage depth estimation model. During the training, the one or more training tillage depth indices, the training soil texture, the one or more training tillage depths measured in the pertaining geo-tagged field, and the one or more training location coordinates present in each training tillage depth sample are passed as input variables and the trained model predicts a training spatial tillage depth map for the corresponding training tillage depth sample. The training spatial tillage depth map includes the one or more tillage depths (in cm or mm) determined in the pertaining geo-tagged field and the one or more location coordinates (in latitudes and longitudes) associated with each of the one or more tillage depths.

The trained tillage depth estimation model estimates the spatial tillage depth map of each geo-tagged field where the tillage operation detected at step 208 of the method 200, based on the one or more tillage depth indices and the soil texture, pertaining to each geo-tagged field.

FIG. 6 illustrates an exemplary spatial tillage depth map for the exemplary geo-tagged field E, according to some embodiments of the present disclosure. As shown in FIG. 6, the numbers mentioned are the estimated tillage depths at each pixel (i.e., grid of fixed distance say 10 meters by 10 meters) of the image in cm.

At step 218 of the method 200, the one or more hardware processors 104 of the system 100 are configured to estimate a fuel quantity required for each geo-tagged field of the one or more geo-tagged fields where the tillage operation detected at step 208 of the method 200. The fuel quantity required for each geo-tagged field indicates the amount of fuel such as a diesel, petrol and so on consumed by a tillage machine used for the tillage operation with the tillage implement.

The fuel quantity required for each geo-tagged field is estimated based on the implement type used which is detected at step 212 of the method 200 and the spatial tillage depth map pertaining to each pre-geo-tagged field estimated at step 216 of the method, using a fuel quantity look-up table. The fuel quantity look-up table includes reference value of fuel quantities required for different tillage machines used for the tillage operation with different tillage implements and based on the different tillage depths. If the geo-tagged field is detected with multiple tillage depths as per the spatial tillage depth map, then the average value of the fuel quantity required is determined. Estimating the fuel quantity for each geo-tagged field is mathematically expressed as in equation 5:

$$\text{Fuel quantity} = f(\text{implement used, depth of tillage}) \quad (5)$$

At step 220 of the method 200, the one or more hardware processors 104 of the system 100 are configured to calculate a carbon emission due to fuel, for each geo-tagged field of the one or more geo-tagged fields where the tillage operation is detected at step 208 of the method 200. The carbon emission due to fuel, for each geo-tagged field, indicates an amount of the carbon emitted as per the type of fuel (such as diesel, petrol, and so on) consumed by the tillage implement (the engine) during the tillage operation. The carbon emission due to fuel, for each geo-tagged field is estimated based on the fuel quantity required pertaining to each geo-tagged field estimated at step 218 of the method 200, using an emission factor look-up table.

The emission factor look-up table includes reference value of carbon emission factors that may be emitted for different fuel types and different fuel quantities consumed by different tillage implements used for the tillage operation with different tillage implements and based on the different tillage depths. If the geo-tagged field is detected with multiple tillage depths as per the spatial tillage depth map, then the average value of the carbon emission factor is determined based on the fuel type. Calculating the carbon emission due to fuel for each geo-tagged field is mathematically expressed as in equation 6:

$$\text{Carbon emissions due to fuel} = f(\text{fuel quantity, Emission factor}) \quad (6)$$

At step 222 of the method 200, the one or more hardware processors 104 of the system 100 are configured to estimate a soil organic carbon (SOC) released due to the tillage operation, for each geo-tagged field of the one or more geo-tagged fields in which the tillage operation is detected at step 208 of the method 200. The soil organic carbon (SOC) released due to the tillage operation, indicates an amount of the soil organic carbon (SOC) which gets released from the top-soil due to tillage operation and depends on different tillage depths. The soil organic carbon (SOC) released due to the tillage operation is estimated based on the spatial tillage depth map estimated at step 216 of the method 200 and the soil texture determined at step 214 of the method, pertaining to each geo-tagged field. Estimating the soil organic carbon (SOC) released due to the tillage operation for each geo-tagged field is mathematically expressed as in equation 7:

$$SOC \text{ released from topsoil} = f(\text{tillage depth, soil texture}) \quad (7)$$

At step 224 of the method 200, the one or more hardware processors 104 of the system 100 are configured to calculate the precise estimation of carbon released due to the tillage operation, for each geo-tagged field of the one or more geo-tagged fields where the tillage operation is detected at step 208 of the method 200. The precise estimation of carbon released due to the tillage operation, for each geo-tagged field, is calculated based on the corresponding soil organic carbon released due to the tillage operation estimated at step 222 of the method 200 and the corresponding carbon emission due to fuel calculated at step 220 of the method 200. More specifically, the precise estimation of carbon released due to the tillage operation is calculated by adding the corresponding soil organic carbon released due to the tillage operation estimated at step 222 of the method 200 and the corresponding carbon emission due to fuel calculated at step 220 of the method 200.

Calculating the carbon released due to the tillage operation for each geo-tagged field is mathematically expressed as in equation 8:

$$\text{Carbon emission} = \quad (8)$$
$$\text{Carbon emissions due to fuel} + SOC \text{ released from topsoil}$$

Hence the methods and systems of the present disclosure estimates the carbon emission due to the tillage operations, by not only considering the tillage operation detected but also considering the type of implement used for the tillage operation, the dynamic tillage depths during the tillage operation and the soil organic carbon released due to the tillage operation. Hence estimates of the carbon emission due to the tillage operations is very accurate and precise.

Further, the methods and systems of the present disclosure predicts the need for variable tillage depths in the given geo-tagged field so that the overall carbon emission due to the tillage operations is minimum and sufficiently enough to reduce the global warming and other environmental calamities. The tillage largely affects the soil physical properties such as a bulk density (g/cm3), a porosity and a hydraulic conductivity of the soil. All the three properties are useful from soil fertility perspective and alters the soil organic matter in the soil. The key objective of the present disclosure and its systems and methods is to provide the variable need map of the tillage based on spatial variation of the bulk density, the porosity, and the hydraulic conductivity For this, at step 226 of the method 200, the one or more hardware processors 104 of the system 100 are configured to determine a pixel-level soil bulk density, a pixel-level soil porosity, and a pixel-level hydraulic conductivity, for each geo-tagged field, from the first image (before the tillage operation), using the image analysis technique. A set of trained machine learning models are employed in this step to determine the pixel-level soil bulk density, the pixel-level soil porosity, and the pixel-level hydraulic conductivity, for each geo-tagged field from the corresponding image. The set of trained machine learning models are pretrained and includes a bulk density prediction model, a porosity prediction model, and a hydraulic conductivity prediction model.

In an embodiment, the bulk density prediction model, the porosity prediction model, and the hydraulic conductivity prediction model, predicts the pixel-level soil bulk density, the pixel-level soil porosity, and the pixel-level hydraulic conductivity respectively, for each geo-tagged field using a set of prediction parameters. The set of prediction parameters includes a spectral region of the image, the normalized difference vegetation indices (NDVIs) (calculated from Sentinel 2 images), the field-level VV backscatter value and the field-level VH backscatter value (obtained from Sentinel 1 image), a soil texture and a cumulative rainfall in the corresponding geo-tagged field. In an embodiment, the bulk density prediction model, the porosity prediction model, and the hydraulic conductivity prediction model are obtained by training a suitable machine learning models with the corresponding training data of the set of prediction parameters. In an embodiment, the spectral region of the image are spectral regions such as R, G, B, NIR, Red-Edge, and so on.

Determining the pixel-level soil bulk density, the pixel-level soil porosity, and the pixel-level hydraulic conductivity (HC) for each geo-tagged field are mathematically expressed as in equation 9, 10, and 11 respectively:

$$\text{Bulk density} = \quad (9)$$
$$f(\text{Spectral regions, Vegetation indices, } VV, VH, \text{Soil Texture, rainfall})$$

$$\text{Porosity} = \quad (10)$$
$$f(\text{Spectral regions, Vegetation indices, } VV, VH, \text{Soil Texture, rainfall})$$

$$\text{Hydraulic Conductivity} = \quad (11)$$
$$f(\text{Spectral regions, Vegetation indices, } VV, VH, \text{Soil Texture, rainfall})$$

FIG. 7 illustrates an exemplary pixel-level soil bulk density, an exemplary pixel-level soil porosity, and an exemplary pixel-level hydraulic conductivity, for the exemplary geo-tagged field E, according to some embodiments of the present disclosure. As shown in FIG. 7, the numbers mentioned are the estimated soil bulk densities, the soil porosities, and the hydraulic conductivities respectively at each pixel (i.e., grid of fixed distance say 10 meters by 10 meters) of the image.

At step 228 of the method 200, the one or more hardware processors 104 of the system 100 are configured to determine a pixel-level tillage depth prescription map, for each geo-tagged field, based on the pixel-level soil bulk density, the pixel-level soil porosity, and the pixel-level hydraulic conductivity, of the pertaining geo-tagged field, obtained at step 226 of the method 200. The pixel-level tillage depth prescription map includes estimated needed tillage depth values at different locations within the geo-tagged field.

FIG. 8 illustrates an exemplary pixel-level tillage depth prescription map with needed tillage depths, for the exemplary geo-tagged field E, according to some embodiments of the present disclosure. As shown in FIG. 8, the exemplary pixel-level tillage depth prescription map shows the required tillage depths at pixel level so that the carbon emission is minimum in contrast to the tillage depths explained with the exemplary spatial tillage depth map of FIG. 6.

At step 230 of the method 200, the one or more hardware processors 104 of the system 100 are configured to calculate the carbon emission due to fuel and the needed tillage depth (predicted at step 228 of the method 200), for each geo-tagged field, based on the fuel quantity required and the pixel-level tillage depth prescription map pertaining to each geo-tagged field obtained at step 228 of the method 200, using the emission factor look-up table. The fuel quantity required at each needed tillage depth is determined in the same process as described at method 218 of the method 200. The pixel-level tillage depth prescription map is similar to the spatial tillage depth map as described at step 216 of the method 200. Further, the carbon emission due to fuel and the needed tillage depth is calculated in the same process as described at method 220 of the method 200.

At step 232 of the method 200, the one or more hardware processors 104 of the system 100 are configured to estimate the soil organic carbon released due to the needed tillage depth, for each geo-tagged field. The soil organic carbon released due to the needed tillage depth, is estimated in the similar process as described at step 222 of the method 200, based on the soil texture and the pixel-level tillage depth prescription map of the pertaining geo-tagged field.

At step 234 of the method 200, the one or more hardware processors 104 of the system 100 are configured to calculate the precise emission of carbon released due to the needed tillage depth, for each geo-tagged field. The precise emission of carbon released due to the needed tillage depth is calculated in the similar process as described at step 224 of the method 200, based on the soil organic carbon released due to the needed tillage depth and the soil organic carbon released due to the needed tillage depth of the pertaining geo-tagged field.

At step 236 of the method 200, the one or more hardware processors 104 of the system 100 are configured to estimate an excessive carbon emission, for each geo-tagged field, based on the precise emission of carbon released due to the tillage operation determined at step 224 of the method 200 and the precise emission of carbon released due to the needed tillage depth calculated at step 234 of the method 200, of the pertaining geo-tagged field. More specifically, the excessive carbon emission for each geo-tagged field is determined by subtracting the precise emission of carbon released due to the tillage operation determined at step 224 of the method 200, from the precise emission of carbon released due to the needed tillage depth calculated at step 234 of the method 200.

The excessive carbon emission for each geo-tagged field estimated at this step guides the user on the ideal tillage depths required by which the carbon emission is minimum rather than the actual tillage depths done during the tillage operation. Hence the needed tillage depths for the nearby geo-tagged field are guided with this approach so that the carbon emission due to the tillage operation is minimum.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of precise estimation of carbon emission due to tillage operations by accounting not only based on the tillage operation detection, but also the type of implement used for tillage and depth of tillage. Further, the present disclosure makes use of satellite image data, which effectively helps in precise estimation of carbon emission due to the tillage operations.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for precise estimation of carbon emission due to tillage operations, comprising the steps of:

receiving, via one or more hardware processors, a pre-defined geographical area in which a tillage operation is performed, wherein the pre-defined geographical area comprises a plurality of geo-tagged fields;

receiving, via the one or more hardware processors, a first image of the pre-defined geographical area and one or more second images of the pre-defined geographical area, using a satellite image data, wherein the first image is before the tillage operation is performed and the one or more second images are after the tillage operation is performed;

determining, via the one or more hardware processors, a field-level vertical-vertical (VV) backscatter difference, a field-level vertical-horizontal (VH) backscatter difference, a field-level VV coherence, a field-level VH coherence, from the first image and the one or more second images, using an image analysis technique;

identifying, via the one or more hardware processors, one or more geo-tagged fields having the tillage operation detected, among the plurality of geo-tagged fields, using a trained tillage operation classification model, based the field-level VV backscatter difference, the field-level VH backscatter difference, the field-level VV coherence, and the field-level VH coherence;

determining, via the one or more hardware processors, for each geo-tagged field of the one or more geo-tagged fields having the tillage operation detected, one or more normalized difference vegetation indices (NDVIs), one or more normalized difference tillage indices (NDTIs), one or more coherence indices, one or more entropy bands, and one or more soil texture bands, from the one or more second images, using the image analysis technique;

detecting, via the one or more hardware processors, an implement type among a plurality of implement types, used for the tillage operation in each geo-tagged field of the one or more geo-tagged fields having the tillage operation detected, using a trained implement type classification model, based on the one or more NDVIs, the one or more NDTIs, the one or more coherence indices, the one or more entropy bands, and the one or more soil texture bands, pertaining to each geo-tagged field;

determining, via the one or more hardware processors, for each geo-tagged field of the one or more geo-tagged fields having the tillage operation detected, one or more tillage depth indices and a soil texture, from the one or more second images, using the image analysis technique;

estimating, via the one or more hardware processors, a spatial tillage depth map, of each geo-tagged field of the one or more geo-tagged fields having the tillage operation detected, using a trained tillage depth estimation model, based on the one or more tillage depth indices and the soil texture, pertaining to each geo-tagged field;

estimating, via the one or more hardware processors, a fuel quantity required for each geo-tagged field of the one or more geo-tagged fields having the tillage operation detected, based on the implement type used and the spatial tillage depth map pertaining to each pre-geo-tagged field, using a fuel quantity look-up table;

calculating, via the one or more hardware processors, a carbon emission due to fuel, for each geo-tagged field of the one or more geo-tagged fields having the tillage operation detected, based on the fuel quantity required pertaining to each geo-tagged field, using an emission factor look-up table;

estimating, via the one or more hardware processors, a soil organic carbon released due to the tillage operation, for each geo-tagged field of the one or more geo-tagged fields having the tillage operation detected, based on the spatial tillage depth map and the soil texture pertaining to each geo-tagged field; and calculating, via the one or more hardware processors, a precise estimation of carbon released due to the tillage operation, for each geo-tagged field of the one or more geo-tagged fields having the tillage operation detected, based on the soil organic carbon released due to the tillage operation and the carbon emission due to fuel, pertaining to each geo-tagged field.

2. The processor-implemented method of claim 1, further comprising:

determining, via the one or more hardware processors, a pixel-level soil bulk density, a pixel-level soil porosity, and a pixel-level hydraulic conductivity, for each geo-tagged field, from the first image, using the image analysis technique and a set of trained machine learning models;

determining, via the one or more hardware processors, a pixel-level tillage depth prescription map, for each geo-tagged field, based on the pixel-level soil bulk density, the pixel-level soil porosity, and the pixel-level hydraulic conductivity, of the pertaining geo-tagged field;

calculating, via the one or more hardware processors, the carbon emission due to fuel and a needed tillage depth, for each geo-tagged field, based on the fuel quantity required and the pixel-level tillage depth prescription map pertaining to each geo-tagged field, using the emission factor look-up table;

estimating, via the one or more hardware processors, the soil organic carbon released due to the needed tillage depth, for each geo-tagged field, based on the soil texture and the pixel-level tillage depth prescription map pertaining to each geo-tagged field;

calculating, via the one or more hardware processors, the precise emission of carbon released due to the needed tillage depth, for each geo-tagged field, based on the soil organic carbon released due to the needed tillage depth and the soil organic carbon released due to the needed tillage depth pertaining to each geo-tagged field; and estimating, via the one or more hardware processors, an excessive carbon emission, for each geo-tagged field, based on the precise emission of carbon released due to the tillage operation and the precise emission of carbon released due to the needed tillage depth, pertaining to each geo-tagged field.

3. The processor-implemented method of claim 1, wherein the spatial tillage depth map of each geo-tagged field comprises one or more tillage depths determined in the pertaining geo-tagged field and one or more location coordinates associated with each of the one or more tillage depths.

4. The processor-implemented method of claim 1, wherein the trained tillage operation classification model is obtained by:

receiving a plurality of training tillage operation samples associated with a plurality of training geo-tagged fields and a training tillage class label associated with each training tillage operation sample of the plurality of training tillage operation samples, wherein each training tillage operation sample comprises a training field-level VV backscatter difference, a training field-level VH backscatter difference, a training field-level VV coherence, and a training field-level VH coherence; and training a random forest classification model, with the plurality of training tillage operation samples and the training tillage class label associated with each training tillage operation sample, to obtain the trained tillage operation classification model.

5. The processor-implemented method of claim 1, wherein the trained implement type classification model is obtained by:

receiving a plurality of training tillage implement samples associated with a plurality of training geo-tagged fields and a training tillage implement type class label associated with each training tillage implement sample of the plurality of training tillage implement samples, wherein each training tillage implement sample comprises one or more training NDVIs, one or more training NDTIs, one or more training coherence indices, one or more training entropy bands, and one or more training soil texture bands; and training a random forest classification model, with the plurality of training tillage implement samples and the training tillage implement type class label associated with each training tillage implement sample, to obtain the trained implement type classification model.

6. The processor-implemented method of claim 1, wherein the trained tillage depth estimation model is obtained by:

receiving a plurality of training tillage depth samples associated with a plurality of training geo-tagged fields, wherein each training tillage depth sample comprises one or more training tillage depth indices, a training soil texture, one or more training tillage depths measured in the pertaining geo-tagged field, and one or more training location coordinates associated with each of the one or more training tillage depths; and training a random forest regression model, with the plurality of training tillage depth samples, to obtain the trained tillage depth estimation model.

7. The processor-implemented method of claim 1, wherein determining the field-level VV backscatter difference, and the field-level VH backscatter difference, from the first image and the one or more second images, using the image analysis technique, comprises:

calculating a field-level VV backscatter value and a field-level VH backscatter value, from each of the first image and the one or more second images;

determining the field-level VV backscatter difference based on the field-level VV backscatter value calculated from each of the first image and the one or more second images; and determining the VH backscatter difference based on the field-level VH backscatter value calculated from each of the first image and the one or more second images.

8. A system comprising:

a memory storing instructions;

one or more input/output (I/O) interfaces; and one or more hardware processors coupled to the memory via the one or more I/O interfaces, wherein the one or more hardware processors are configured by the instructions to:

receive a pre-defined geographical area in which a tillage operation is performed, wherein the pre-defined geographical area comprises a plurality of geo-tagged fields;

receive a first image of the pre-defined geographical area and one or more second images of the pre-defined geographical area, using a satellite image data, wherein the first image is before the tillage operation is performed and the one or more second images are after the tillage operation is performed;

determine a field-level vertical-vertical (VV) backscatter difference, a field-level vertical-horizontal (VH) backscatter difference, a field-level VV coherence, a field-level VH coherence, from the first image and the one or more second images, using an image analysis technique;

identify one or more geo-tagged fields having the tillage operation detected, among the plurality of geo-tagged fields, using a trained tillage operation classification model, based the field-level VV backscatter difference, the field-level VH backscatter difference, the field-level VV coherence, and the field-level VH coherence;

determine for each geo-tagged field of the one or more geo-tagged fields having the tillage operation detected, one or more normalized difference vegetation indices (NDVIs), one or more normalized difference tillage indices (NDTIs), one or more coherence indices, one or more entropy bands, and one or more soil texture bands, from the one or more second images, using the image analysis technique;

detect an implement type among a plurality of implement types, used for the tillage operation in each geo-tagged field of the one or more geo-tagged fields having the tillage operation detected, using a trained implement type classification model, based on the one or more NDVIs, the one or more NDTIs, the one or more coherence indices, the one or more entropy bands, and the one or more soil texture bands, pertaining to each geo-tagged field;

determine for each geo-tagged field of the one or more geo-tagged fields having the tillage operation detected, one or more tillage depth indices and a soil texture, from the one or more second images, using the image analysis technique;

estimate a spatial tillage depth map, of each geo-tagged field of the one or more geo-tagged fields having the tillage operation detected, using a trained tillage depth estimation model, based on the one or more tillage depth indices and the soil texture, pertaining to each geo-tagged field;

estimate a fuel quantity required for each geo-tagged field of the one or more geo-tagged fields having the tillage operation detected, based on the implement type used and the spatial tillage depth map pertaining to each pre-geo-tagged field, using a fuel quantity look-up table;

calculate a carbon emission due to fuel, for each geo-tagged field of the one or more geo-tagged fields having the tillage operation detected, based on the fuel quantity required pertaining to each geo-tagged field, using an emission factor look-up table;

estimate a soil organic carbon released due to the tillage operation, for each geo-tagged field of the one or more geo-tagged fields having the tillage operation detected, based on the spatial tillage depth map and the soil texture pertaining to each geo-tagged field; and calculate a precise estimation of carbon released due to the tillage operation, for each geo-tagged field of the one or more geo-tagged fields having the tillage operation detected, based on the soil organic carbon released due to the tillage operation and the carbon emission due to fuel, pertaining to each geo-tagged field.

9. The system of claim 8, wherein the one or more hardware processors are further configured to:

determine a pixel-level soil bulk density, a pixel-level soil porosity, and a pixel-level hydraulic conductivity, for each geo-tagged field, from the first image, using the image analysis technique and a set of trained machine learning models;

determine a pixel-level tillage depth prescription map, for each geo-tagged field, based on the pixel-level soil bulk density, the pixel-level soil porosity, and the pixel-level hydraulic conductivity, of the pertaining geo-tagged field;

calculate the carbon emission due to fuel and a needed tillage depth, for each geo-tagged field, based on the fuel quantity required and the pixel-level tillage depth prescription map pertaining to each geo-tagged field, using the emission factor look-up table;

estimate the soil organic carbon released due to the needed tillage depth, for each geo-tagged field, based on the soil texture and the pixel-level tillage depth prescription map pertaining to each geo-tagged field;

calculate the precise emission of carbon released due to the needed tillage depth, for each geo-tagged field, based on the soil organic carbon released due to the needed tillage depth and the soil organic carbon released due to the needed tillage depth pertaining to each geo-tagged field; and estimate an excessive carbon emission, for each geo-tagged field, based on the precise emission of carbon released due to the tillage operation and the precise emission of carbon released due to the needed tillage depth, pertaining to each geo-tagged field.

10. The system of claim 8, wherein the spatial tillage depth map of each geo-tagged field comprises one or more tillage depths determined in the pertaining geo-tagged field and one or more location coordinates associated with each of the one or more tillage depths.

11. The system of claim 8, wherein the one or more hardware processors are configured to obtain the trained tillage operation classification model, by:

receiving a plurality of training tillage operation samples associated with a plurality of training geo-tagged fields and a training tillage class label associated with each training tillage operation sample of the plurality of training tillage operation samples, wherein each training tillage operation sample comprises a training field-level VV backscatter difference, a training field-level VH backscatter difference, a training field-level W coherence, and a training field-level VH coherence; and training a random forest classification model, with the plurality of training tillage operation samples and the training tillage class label associated with each training tillage operation sample, to obtain the trained tillage operation classification model.

12. The system of claim 8, wherein the one or more hardware processors are configured to obtain the trained implement type classification model, by:

receiving a plurality of training tillage implement samples associated with a plurality of training geo-tagged fields and a training tillage implement type class label associated with each training tillage implement sample of the plurality of training tillage implement samples, wherein each training tillage implement sample comprises one or more training NDVIs, one or more training NDTIs, one or more training coherence indices, one or more training entropy bands, and one or more training soil texture bands; and training a random forest classification model, with the plurality of training tillage implement samples and the training tillage implement type class label associated with each training tillage implement sample, to obtain the trained implement type classification model.

13. The system of claim 8, wherein the one or more hardware processors are configured to obtain the trained tillage depth estimation model, by:

receiving a plurality of training tillage depth samples associated with a plurality of training geo-tagged fields, wherein each training tillage depth sample comprises one or more training tillage depth indices, a training soil texture, one or more training tillage depths measured in the pertaining geo-tagged field, and one or more training location coordinates associated with each of the one or more training tillage depths; and training a random forest regression model, with the plurality of training tillage depth samples, to obtain the trained tillage depth estimation model.

14. The system of claim 8, wherein the one or more hardware processors are configured to determine the field-level W backscatter difference, and the field-level VH backscatter difference, from the first image and the one or more second images, using the image analysis technique, by:

calculating a field-level VV backscatter value and a field-level VH backscatter value, from each of the first image and the one or more second images;

determining the field-level VV backscatter difference based on the field-level VV backscatter value calculated from each of the first image and the one or more second images; and determining the VH backscatter difference based on the field-level VH backscatter value calculated from each of the first image and the one or more second images.

15. One or more non-transitory machine-readable information storage mediums comprising one or more instructions which when executed by one or more hardware processors cause:

receiving a pre-defined geographical area in which a tillage operation is performed, wherein the pre-defined geographical area comprises a plurality of geo-tagged fields;

receiving a first image of the pre-defined geographical area and one or more second images of the pre-defined geographical area, using a satellite image data, wherein the first image is before the tillage operation is performed and the one or more second images are after the tillage operation is performed;

determining a field-level vertical-vertical (VV) backscatter difference, a field-level vertical-horizontal (VH) backscatter difference, a field-level VV coherence, a field-level VH coherence, from the first image and the one or more second images, using an image analysis technique;

identifying one or more geo-tagged fields having the tillage operation detected, among the plurality of geo-tagged fields, using a trained tillage operation classification model, based the field-level VV backscatter difference, the field-level VH backscatter difference, the field-level VV coherence, and the field-level VH coherence;

determining for each geo-tagged field of the one or more geo-tagged fields having the tillage operation detected, one or more normalized difference vegetation indices (NDVIs), one or more normalized difference tillage indices (NDTIs), one or more coherence indices, one or more entropy bands, and one or more soil texture bands, from the one or more second images, using the image analysis technique;

detecting an implement type among a plurality of implement types, used for the tillage operation in each geo-tagged field of the one or more geo-tagged fields having the tillage operation detected, using a trained implement type classification model, based on the one or more NDVIs, the one or more NDTIs, the one or more coherence indices, the one or more entropy bands, and the one or more soil texture bands, pertaining to each geo-tagged field;

determining for each geo-tagged field of the one or more geo-tagged fields having the tillage operation detected, one or more tillage depth indices and a soil texture, from the one or more second images, using the image analysis technique;

estimating a spatial tillage depth map, of each geo-tagged field of the one or more geo-tagged fields having the tillage operation detected, using a trained tillage depth estimation model, based on the one or more tillage depth indices and the soil texture, pertaining to each geo-tagged field;

estimating a fuel quantity required for each geo-tagged field of the one or more geo-tagged fields having the tillage operation detected, based on the implement type used and the spatial tillage depth map pertaining to each pre-geo-tagged field, using a fuel quantity look-up table;

calculating a carbon emission due to fuel, for each geo-tagged field of the one or more geo-tagged fields having the tillage operation detected, based on the fuel quantity required pertaining to each geo-tagged field, using an emission factor look-up table;

estimating a soil organic carbon released due to the tillage operation, for each geo-tagged field of the one or more geo-tagged fields having the tillage operation detected, based on the spatial tillage depth map and the soil texture pertaining to each geo-tagged field; and calculating a precise estimation of carbon released due to the tillage operation, for each geo-tagged field of the one or more geo-tagged fields having the tillage operation detected, based on the soil organic carbon released due to the tillage operation and the carbon emission due to fuel, pertaining to each geo-tagged field.

16. The one or more non-transitory machine-readable information storage mediums of claim 15, wherein the one or more instructions which when executed by the one or more hardware processors further cause:

determining a pixel-level soil bulk density, a pixel-level soil porosity, and a pixel-level hydraulic conductivity, for each geo-tagged field, from the first image, using the image analysis technique and a set of trained machine learning models;

determining a pixel-level tillage depth prescription map, for each geo-tagged field, based on the pixel-level soil bulk density, the pixel-level soil porosity, and the pixel-level hydraulic conductivity, of the pertaining geo-tagged field;

calculating the carbon emission due to fuel and a needed tillage depth, for each geo-tagged field, based on the fuel quantity required and the pixel-level tillage depth prescription map pertaining to each geo-tagged field, using the emission factor look-up table;

estimating the soil organic carbon released due to the needed tillage depth, for each geo-tagged field, based on the soil texture and the pixel-level tillage depth prescription map pertaining to each geo-tagged field;

calculating the precise emission of carbon released due to the needed tillage depth, for each geo-tagged field, based on the soil organic carbon released due to the needed tillage depth and the soil organic carbon released due to the needed tillage depth pertaining to each geo-tagged field; and estimating an excessive carbon emission, for each geo-tagged field, based on the precise emission of carbon released due to the tillage operation and the precise emission of carbon released due to the needed tillage depth, pertaining to each geo-tagged field.

* * * * *